(12) United States Patent
Sitharaman et al.

(10) Patent No.: US 9,630,848 B2
(45) Date of Patent: Apr. 25, 2017

(54) THREE-DIMENSIONAL CARBON STRUCTURES

(71) Applicant: The Research Foundation for The State University of New York, Albany, NY (US)

(72) Inventors: Balaji Sitharaman, Coram, NY (US); Gaurav Lalwani, Stony Brook, NY (US)

(73) Assignee: The Research Foundation for The State of New York, Albany, NY (US)

( * ) Notice: Subject to any disclaimer, the term of this patent is extended or adjusted under 35 U.S.C. 154(b) by 24 days.

(21) Appl. No.: 14/390,914

(22) PCT Filed: Apr. 4, 2013

(86) PCT No.: PCT/US2013/035190
§ 371 (c)(1),
(2) Date: Oct. 6, 2014

(87) PCT Pub. No.: WO2013/152144
PCT Pub. Date: Oct. 10, 2013

(65) Prior Publication Data
US 2015/0118492 A1    Apr. 30, 2015

Related U.S. Application Data

(60) Provisional application No. 61/620,643, filed on Apr. 5, 2012.

(51) Int. Cl.
*C01B 31/02*    (2006.01)
(52) U.S. Cl.
CPC ...... *C01B 31/0253* (2013.01); *C01B 31/0206* (2013.01); *Y10T 428/2982* (2015.01)

(58) Field of Classification Search
CPC ............ C01B 31/0206; C01B 31/0253; Y10T 428/2982
(Continued)

(56) References Cited

U.S. PATENT DOCUMENTS

| 6,872,681 B2 | 3/2005 | Niu et al. |
| 7,070,753 B2 | 7/2006 | Niu et al. |

(Continued)

FOREIGN PATENT DOCUMENTS

| RU | 2 264 415 C2 | 2/2005 |
| RU | 2 299 232 C1 | 5/2007 |
| WO | WO 02/095098 A1 | 11/2002 |
| WO | WO 2006/055670 A2 | 5/2006 |
| WO | WO 2010/033903 A1 | 3/2010 |

OTHER PUBLICATIONS

Bunker, et al., Fullerene-Styrene Random Copolymers. Novel Optical Properties, Macromolecules 1995; 28: 3744-3746.*

(Continued)

*Primary Examiner* — Daniel C McCracken
(74) *Attorney, Agent, or Firm* — Scully, Scott, Murphy & Presser, P.C.

(57) ABSTRACT

The method of the present disclosure is directed towards the formation of a three-dimensional carbon structure and includes the steps of adding a radical initiator to an amount of carbon starting material, forming a mixture, placing the mixture in a mold, maintaining the mixture and the mold at an elevated temperature for a period of time to form a thermally cross-linked molded mixture and removing the thermally cross-linked molded mixture from the mold. The disclosure also includes a three-dimensional carbon structure, with that structure including a thermally cross-linked carbon base material in a predetermined formation.

21 Claims, 6 Drawing Sheets

(58) Field of Classification Search
USPC .................................. 423/447.1, 460; 428/402
See application file for complete search history.

(56) References Cited

U.S. PATENT DOCUMENTS

| | | | |
|---|---|---|---|
| 7,125,533 | B2 | 10/2006 | Khabashesku et al. |
| 7,740,826 | B2 | 6/2010 | Khabashesku et al. |
| 7,976,816 | B2 | 7/2011 | Khabashesku et al. |
| 2003/0230818 | A1* | 12/2003 | Chopra .................. B01J 13/10 264/4 |
| 2004/0223900 | A1* | 11/2004 | Khabashesku ......... B82Y 30/00 423/447.1 |
| 2006/0231494 | A1 | 10/2006 | Lu et al. |
| 2008/0160308 | A1* | 7/2008 | Hwang .................. B82Y 30/00 428/402 |
| 2010/0072137 | A1 | 3/2010 | Linford et al. |
| 2010/0303706 | A1 | 12/2010 | Wallace et al. |
| 2011/0189452 | A1* | 8/2011 | Lettow .................... B05D 3/10 428/220 |
| 2015/0118492 | A1* | 4/2015 | Sitharaman ......... C01B 31/0206 428/402 |

OTHER PUBLICATIONS

Bengu E. et al., "Single-Walled BN Nanostructures", Physical Review Letters 86(11):2385-2387 (Mar. 12, 2001).

Hashim D.P. et al., "Covalently Bonded Three-Dimensional Carbon Nanotube Solids Via Boron Induced Nanojunctions", Scientific Reports 2(363):1-8 (2012).

Romo-Herrera J.M. et al., "Covalent 2D and 3D Networks from 1D Nanostructures: Designing New Materials", Nano Letters 7(3):570-576 (2007).

Xiong W. et al., "3-D Carbon Nanotube Structures Used as High Performance Catalyst for Oxygen Reduction Reaction", J. Am. Chem. Soc. 132(45):15839-15841 (2010).

Zhong S. et al., "Fabrication of Large Pores in Electrospun Nanofibrous Scaffolds for Cellular Infiltration: A Review", Tissue Engineering Part B, 18(2):77-87 (Nov. 2, 2012) (13 pages total).

International Search Report dated Aug. 29, 2013 received from related Application No. PCT/US2013/035190.

Speltini A. et al., "Analytical Application of Carbon Nanotubes, Fullerences and Nanodiamonds in Nanomaterials-Based Chromatographic Stationary Phases: A Review", Analytica Chimica Acta 783:1-16 (2013).

* cited by examiner

THREE-DIMENSIONAL CARBON STRUCTURES

BACKGROUND OF THE DISCLOSURE

Over the last decade, three-dimensional carbon scaffolds have been fabricated using various techniques such as chemical vapor deposition, substrate patterning and capillary-induced self-assembly. However, these approaches present a practical challenge to develop further carbon devices; either due to scalability issues, or high operational cost.

Three-dimensional microscopic scaffolds using carbon nanotubes have previously been assembled via techniques such as pattern transfer, stereo-lithography, focused ion beam lithography and chemical vapor deposition; collectively referred to as "pre-patterned" or "bottom-up" approaches. Various "top-down" approaches such as capillary-induced self-assembly and nanotube-polymer hybrids offer the potential of cheaper, and potentially scalable methods for the fabrication of three-dimensional scaffolds with carbon nanotubes. Using these strategies, three-dimensional structures of carbon nanotubes have been synthesized. However, the suitability of these top-down and bottom-up approaches as a versatile method to fabricate three-dimensional all carbon scaffolds with various carbon nanomaterials, such as fullerenes and graphene, has not been demonstrated.

Embodiments of the present application provide methods and structures that address the above and other issues.

SUMMARY OF THE DISCLOSURE

The present disclosure is directed to three-dimensional carbon nanostructures and methods of making the same. The method of forming the three-dimensional carbon structure includes the steps of adding a radical initiator to an amount of carbon starting material, forming a mixture, placing the mixture in a mold, maintaining the mixture and the mold at an elevated temperature for a period of time to form a thermally cross-linked molded mixture and removing the thermally cross-linked molded mixture from the mold. The method also includes the addition of a halogenated methane to the mixture prior to the slurry being placed in the mold. The method also includes the halogenated methane being chloroform. The method also includes the carbon starting material being selected from the group consisting of multiwalled carbon nanotubes (MWCNT), single-walled carbon nanotubes (SWCNT), fullerenes and graphene. The method also includes the thermally cross-linked molded mixture being greater than or equal to 1 millimeter in at least one dimension. The method also includes the thermally cross-linked molded mixture being less than 1 millimeter in all dimensions. The method also includes a radical initiator selected from the group consisting of a peroxide, benzoyl peroxide, a compound with a peroxide functional group (ROOR'), methyl ethyl ketone peroxide, Di-tert-butyl peroxide, benzoyl peroxide, acetone peroxide, bisacylphosphine oxide (BAPO), aluminophosphate (MAPO), tert-Amylperoxy-2-ethyl (TAPO) or azobisisobutyronitrile (AIBN) and combinations thereof.

The method also includes the thermally cross-linked molded mixture having a pore size in the range of about 125 nanometers to about 200 micrometers. The method also includes the thermally cross-linked molded mixture structure having porosity in the range of about 20% to about 85%. The method also includes the ratio of the carbon starting material to the amount of radical initiator being in the range of about 1:0.5 to about 1:4.

The disclosure is also directed towards a three-dimensional carbon structure, the structure including a thermally cross-linked carbon base material in a predetermined formation. The structure also includes porosity in the range of about 20% to about 85%. The structure also includes the predetermined formation of the structure being greater than or equal to 1 millimeter in at least one dimension. The structure also includes the predetermined formation of the structure being less than 1 millimeter in all dimensions. The structure also includes a pore size in the range of about 125 nanometers to about 200 micrometers. Three-dimensional carbon structures of the present disclosure can be seen in FIGS. 1 and 2.

BRIEF DESCRIPTION OF THE DRAWINGS

The present disclosure will be better understood by reference to the following drawings of which.

DETAILED DESCRIPTION

The disclosure includes a method of forming a three-dimensional carbon structure. The method for forming a three-dimensional carbon structure has several steps, the first being the addition of a radical initiator to an amount of carbon starting material to form a mixture of the two. The radical initiator can be any suitable peroxide, including but not limited to benzoyl peroxide, any compound containing a peroxide functional group (ROOR') including but not limited to, methyl ethyl ketone peroxide, Di-tert-butyl peroxide, benzoyl peroxide, and acetone peroxide and the radical initiator can be bisacylphosphine oxide (BAPO), aluminophosphate (MAPO), tert-Amylperoxy-2-ethyl (TAPO) or azobisisobutyronitrile (AIBN). The carbon starting material can be any suitable carbon starting material, including but not limited to multiwalled carbon nanotubes (MWCNT), single-walled carbon nanotubes (SWCNT), fullerenes, grapheme and any carbon network that containing Pi bonds such as, but not limited to dicarbon bonds. The ratio of addition of each component, carbon material to radical initiator, can be any suitable ratio, including in the range of about 1:0.5 to about 1:4. This method can form three-dimensional, free standing, all-carbon scaffolds prepared via radical initiated thermal cross-linking of a suitable starting material, such as MWCNTs that will possess robust structural integrity and stability.

Upon mixture of the radical initiator and carbon starting material, a thermal cross-linking process begins via radical initiation by the radical initiator. Radical initiators, including peroxides, are used as an initiator in a free radical polymerization reaction with the suitable carbon starting material. The radical initiator thermally decomposes to yield phenyl free radicals, and $CO_2$ gas, and is used for covalent functionalization of carbon starting materials. The phenyl radical formed via decomposition of the radical initiator attacks the pi bond carbon network on the suitable carbon starting material structure; thereby forming active centers, which serve as inter-nanotube and inter-material cross-linking sites.

Following the mixture of the radical initiator and the suitable carbon starting material, there is an optional step of adding a solvent, chloromethane or halogenated methane, such as chloroform, to the mixture. The optional additive acts to dissolve the radical initiator and aid in a more uniform dispersion of the radical initiator.

After the mixture of the radical initiator and the suitable carbon starting material, or after the addition of a halogenated methane thereto, the mixture is placed into a prefabricated mold. The mold can be in any suitable shape based on the shape of the desired end result structure. The mixture inside the mold and the mold itself are then maintained at an elevated temperature for a period of time. This period of time can range anywhere from about 3 hours to about 72 hours, or from about 12 hours to about 40 hours or from about 20 hours to about 30 hours. The elevated temperature can be any temperature suitable to allow cross-linking of the suitable carbon starting material. This elevated temperature can range anywhere from about 20° C. to about 100° C., or from about 40° C. to about 80° C., or from about 50° C. to about 70° C., more specifically about any of the following temperatures 51° C., 52° C., 53° C., 54° C., 55° C., 56° C., 57° C., 58° C., 59° C., 60° C., 61° C., 62° C., 63° C., 64° C., 65° C., 66° C., 67° C., 68° C. or 69° C. Also, the mixture of radical initiator and suitable carbon starting material can be photo cross linked instead of thermal cross-linked by exposure to ultraviolet (UV) light at varying wavelengths or other forms of ionizing radiation, such as x-ray and gamma ray wavelengths.

After the period of time at the elevated temperature passes, a thermally cross-linked molded structure remains within the mold, which is then removed from the mold. The thermally cross-linked molded carbon structure can be any size suitable for the specific application. In some instances a relatively large structure is desired, one having a size of greater than or equal to 1 millimeter in at least one dimension. In other instances, a relatively smaller structure is desired, one having a size less than 1 millimeter in all dimensions.

An optional step after removal of the molded carbon structure is an annealing step, which subjects the carbon structure to a temperature of about 150° C. for about 20 minutes. This temperature and time can also be any suitable temperature and time, including but not limited to about 100° C. to about 200° C. and from about 10 minutes to about 30 minutes.

The thermally cross-linked molded carbon structure possesses nano-, micro- and macro-scale-interconnected pores. The porosity and pore size of the carbon structures can be controlled by varying the amount of radical initiator added earlier in the method. Based on the amount of added radical initiator, the thermally cross-linked molded structure will have a pore diameter in the range of less than 125 nanometers to about 325 micrometers. The thermally cross-linked molded carbon structure can also have a pore size in the range of about 250 nanometers to about 150 micrometers, or about 500 nanometers to about 100 micrometers, or about 1 micrometer to about 50 micrometers. Also, based on the amount of added radical initiator, the thermally cross-linked molded structure will have a porosity in the range of about 20% to about 95%. The thermally cross-linked molded carbon structure can also have a porosity at about any of the following percentages, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84% 85%, 86%, 87%, 88%, 89%, 90%, 91%, 92%, 93% or 94%.

The disclosure also includes a three-dimensional carbon structure comprising a thermally cross-linked carbon base material in a predetermined formation. The thermally cross-linked carbon base material is created as described herein and can be formed into any shape depending on desired use. The possible uses of the formed three-dimensional carbon structure are copious, including the use of the structures in clean technologies such as in energy storage, as a component of fuel cells, as high performance catalysts, super capacitors, or as a component of photovoltaic cells, in the telecommunication industry, such as components for absorbing electromagnetic signals to send information between devices, in field emission devices, in smart sensors or other electronic devices, in the healthcare industry as scaffolds for tissue engineering and various implants, membranes for filtration and as drug delivery vehicles. Although the above list includes many possible uses, the universe of possible uses for the described three-dimensional structure is much greater.

Depending on the desired use, the three-dimensional carbon structure can have a relatively large formation, such as at least one dimension of the structure being greater than or equal to 1 millimeter in at least one dimension. For other desired uses, the three-dimensional carbon structure can have a relatively small formation, such as that all dimensions are less than 1 millimeter.

The porosity of the three-dimensional carbon structure can be controlled by varying the amount of radical initiator utilized during its creation and can be tailored towards the desired use of the three-dimensional carbon structure. Based on the desired use, the three-dimensional structure can have a porosity in the range of about 20% to about 95% and have a pore diameter in the range of less than 125 nanometers to about 325 micrometers.

The carbon structure can also have a pore size in the range of about 250 nanometers to about 150 micrometers, or about 500 nanometers to about 100 micrometers, or about 1 micrometer to about 50 micrometers. Also, the three dimensional structure can have a porosity at about any of the following percentages, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83% or 84%.

The three-dimensional carbon structure includes favorable mechanical properties, such as hardness and elastic modulus. Based on the ratio of the carbon starting material to the amount of radical initiator, the elastic modulus of the carbon structure is from about 16 MPa to about 84 MPa while the hardness of the carbon structure is from about 0.7 MPa to about 4.9 MPa.

The following examples are provided to further illustrate the methods and structures of the present disclosure and demonstrate some advantages that arise therefrom. It is not intended that the present disclosure be limited to the specific examples disclosed.

EXAMPLE 1

In the following non-limiting example, multiwalled carbon nanotubes (MWCNT) (Sigma Aldrich, Cat No. 659258), single walled carbon nanotubes (SWCNT) (Sigma Aldrich, Cat No. 519308), fullerenes (Sigma Aldrich, Cat No. 483036), benzoyl peroxide (Luperox®, Sigma Aldrich, Cat No. 179981) and chloroform (Fisher Scientific, Cat No. BPC297) were used as purchased. MWCNT, SWCNT and fullerenes were mixed with benzoyl peroxide at different weight ratios (1:0.5, 1:1, 1:2, 1:3 and 1:4) and 1 ml $CHCl_3$ was added to the mixture. The mixture was poured in custom machined Teflon molds (length=1.2 mm, diameter=0.5 mm) and incubated at 60° C. for 24 hours. Post incubation, the molds were disassembled and cross-linked three-dimensional carbon structures were obtained.

After incubation, Raman analysis was performed using a WITec alpha300R Micro-Imaging Raman Spectrometer using a 532 nm Nd—YAG excitation laser. Point spectra were recorded between 50-3750 $cm^{-1}$ at room temperature.

Micro-Computed Tomography (CT) analysis was performed to quantify the three-dimensional porosity of MWCNT specimens. A Scanco Medical microCT-40 was used at 45 kV and 177 μA current. All scans were performed in air by placing the sample in 12.3 mm field of view tubes and averaging the data 3 times. The threshold values were optimized to accurately represent the raw images of the structures. Volume reconstruction and analysis of five cubes (900 $\mu m^3$ volume) per sample was performed using gauss sigma: 0.3, gauss support: 1, lower threshold: 30 and upper threshold: 1000; by a vertebrae quantification script. The regions of analysis were selected in the center of the structure to eliminate the edge artifacts. The porosity of the structures was calculated as:

Porosity %=100-total volume % of objects in VOI

Scanning electron microscopy (SEM) was performed using JOEL 7600F Analytical high resolution SEM. Structures were placed on a conductive, double sided, carbon adhesive tab (PELCO, Ted Pella) and imaged at 1 and 5 kV accelerating voltages using a secondary electron imaging (SEI) detector. Transmission electron microscopy (TEM) was performed using FEI BioTwinG² TEM at Stony Brook University. The samples were imaged at 80 kV using 300 mesh size, holey lacey carbon grids (Ted Pella, Inc.).

Image processing toolbox in MATLAB was used to quantify the porosity values of the structures. SEM images at various magnifications were cropped to remove the legend and the scale bar and were subjected to image processing steps such as edge detection, thresholding, median filtration followed by quantification of region properties using region-props. Porosity was calculated using n=5 images as the ratio of the total area of voids to the total area of the image, using the following formula:

Porosity (%)=(ΣArea of voids/area of the image)*100

In order to eliminate errors and have an accurate estimation of porosity from the SEM images, multiple images (n=5) of different magnifications were analyzed. Statistical analysis was performed using a student's t test and one-way anova followed by Tukey Kramer post hoc analysis. A 95% confidence interval ($p<0.05$) was used for all statistical analysis.

Liquid extrusion porosimetry (LEP) was performed on purified MWCNT scaffolds using the PMI liquid extrusion porosimeter at Porous Materials Inc., Ithaca, N.Y. The CNT scaffolds were placed on a membrane and the sample chamber was filled with Galwick® (wetting liquid, surface tension ≈0, propene, 1,1,2,3,3,3-hexafluoro, oxidized, polymerized) which penetrates into the pores of the sample. An inert gas under pressure was applied to extrude the liquid from the pores of the MWCNT scaffold. The volume and weight of the extruded liquid was measured, and porosity and median pore diameter were calculated as described previously.

EXAMPLE 2

Figure 1:
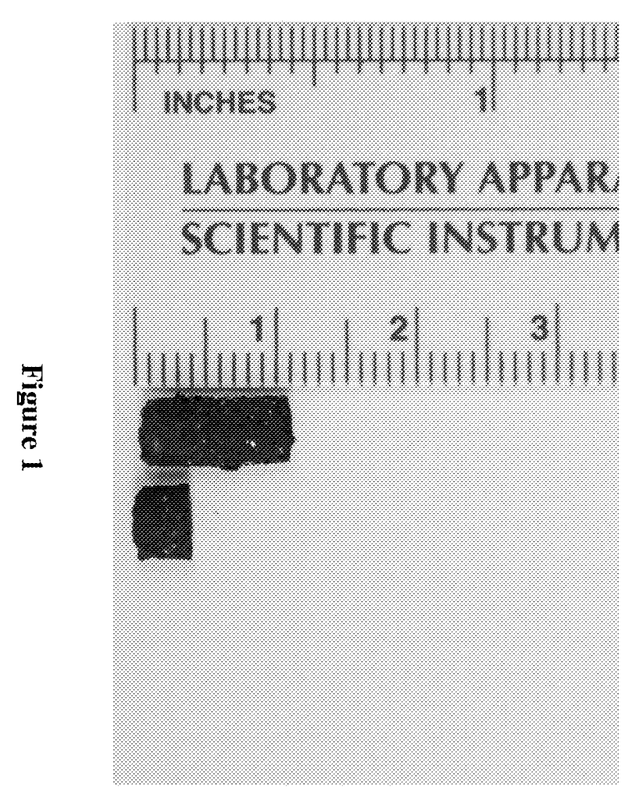
FIG. 1 is a photographic representation of a three-dimensional carbon structure fabricated from multiwalled carbon nanotubes (MWCNT)
Figure 2:
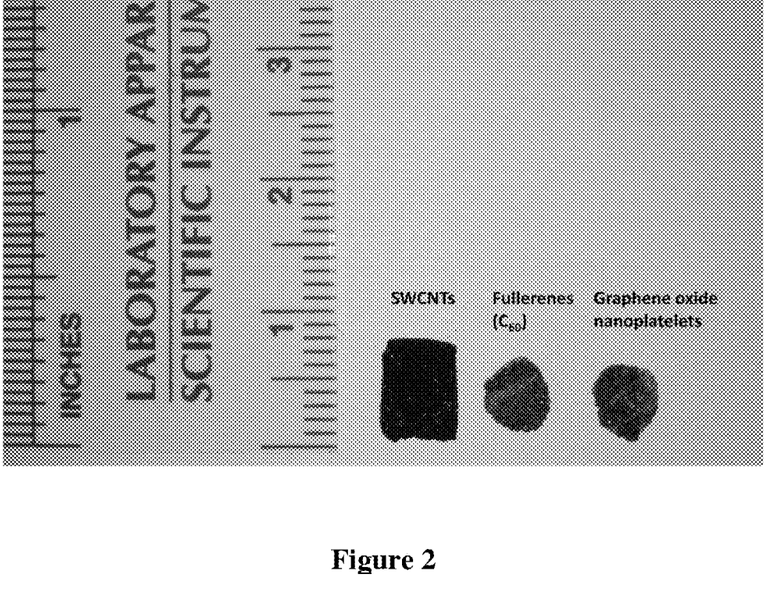
FIG. 2 is a photographic representation of three-dimensional carbon structures fabricated from single-wall carbon nanotubes, fullerenes and graphenes.

In the following example, MWCNTs and benzoyl peroxide were mixed in the ratio of 1:2 according to the described methods to form two three-dimensional carbon structures of different dimensions. As can be seen in FIG. 1, the three-dimensional carbon structures formed of MWCNTs are robust, free-standing structures, and structurally stable. Although the examples herein are described as being formed from MWCNTs, three-dimensional carbon structures can also be formed of SWCNTs, fullerenes such as $C_{60}$, and graphene, as seen in FIG. 2.

Figure 3:
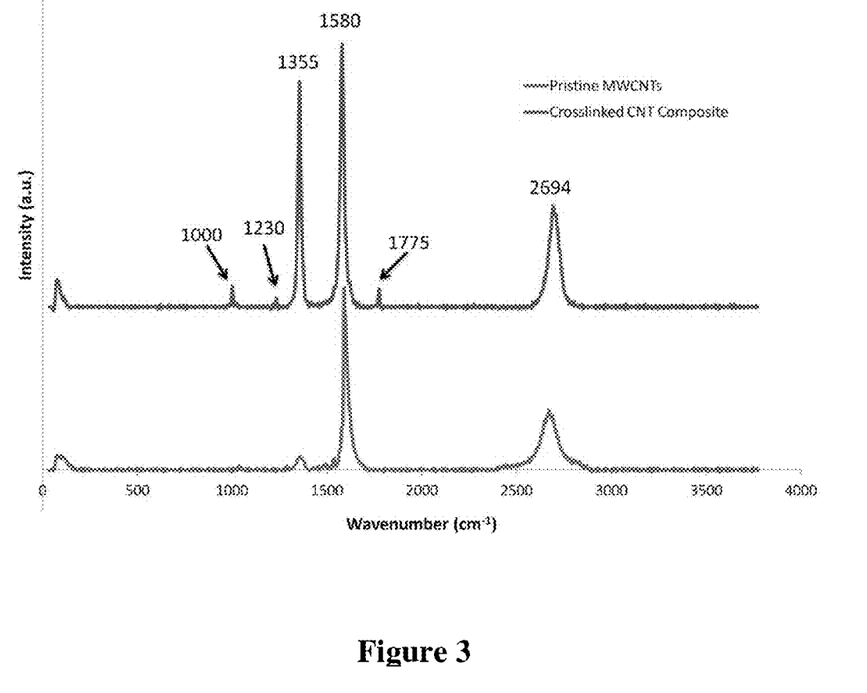
FIG. 3 is a graphical representation of the Raman spectra of unmodified MWCNTs and the Raman spectra of a three-dimensional carbon structure of the present disclosure.

Results of Raman analysis of the three-dimensional carbon structures are shown in FIG. 3. Raman spectra of un-reacted MWCNTs (lower data line of FIG. 3) and three-dimensional carbon structures (upper data line of FIG. 3) are shown. The characteristic D band (1355 $cm^{-1}$), G band (1580 $cm^{-1}$) and G' band (2694 $cm^{-1}$) were observed for un-reacted MWCNTs. The three-dimensional carbon structures showed peaks at 1000 $cm^{-1}$, 1230 $cm^{-1}$ and 1775 $cm^{-1}$ in addition to the characteristic MWCNT spectra. The G band in the Raman spectra has been attribute to the intrinsic vibration of $sp^2$ bonded carbon atoms, whereas D band corresponds to the defects induced in the nanotube structure due to disruption of the $sp^2$ (C═C) bonds. $I_D/I_G$ ratio for un-reacted MWCNTs was 0.07 which increased to 0.85 for the three-dimensional carbon structures indicating the disruption of the $sp^2$ bonded C═C domains.

Additional minor peaks at 1000 $cm^{-1}$, 1230 $cm^{-1}$ and 1775 $cm^{-1}$ were observed in the three-dimensional carbon structures, which can be attributed to the breathing mode (C—C stretching) of benzene ring, C—O bond stretching (vibration of the peroxide chain) and C═O bond stretching (aryl carbonate functional group), respectively. The intensities of these peaks were relatively minor compared to the D and G bands, and repeatedly observed in the Raman spectra. This data may suggest that benzoyloxyl and phenyl radicals react with the MWCNT initiating the cross-linking reaction to form the three-dimensional carbon structures.

In the case of the three-dimensional carbon structures, an increase in the intensity of the D band was observed corresponding to the disruption of the $sp^2$ carbon network due to the reaction of the benzoyl peroxide with the MWCNTs.

EXAMPLE 3

In the following example, MWCNTs and benzoyl peroxide were mixed in ratios of 1:1 and 1:2 according to the described methods to form a carbon structure.

The mechanical properties of MWCNT scaffolds were determined using nanoindentation (Triboindenter; Hysitron, Minneapolis, Minn.) with a Berkovich indenter tip. MWCNT scaffolds were attached to metal disks using cyanocryolate and mounted into the indenter. The points of indentation were selected at a distance no less than 100 μm away from each other. Samples were indented 7 times to determine elastic modulus (Er) and material hardness (H). The tip area function was calibrated from indentation analysis on fused quartz, and drift rates in the system were measured prior to each indentation using standard indentation testing procedures. First, a preload of 3 μN was applied to the system followed by a constant loading rate (10 μN/s). Then a hold segment at a fixed system load was applied, followed by a constant unloading rate to retract the tip (−10μ/s), then another hold segment was imposed (3 μN). The sample was indented with peak loads ranging from ≈15 μN to 100 μN. The elastic response was calculated from the 20% to 90% portion of the unloading curve using methods previously described.

Table 1 summarizes values of elastic modulus (Er) and hardness (H) measured by 7 indents (at least 100 μm distance between each indent). Er and H values of MWCNT scaffold (1:1) were 38.45±14.42 MPa and 1.82±0.54 MPa, respectively. MWCNT scaffold (1:2) exhibited Er of 45.72±18.78 MPa and H of 3.47±1.73 MPa, higher than 1:1 MWCNT:BP scaffold. These elastic modulus values for MWCNT scaffolds are significantly higher than the values measured for various polymeric, graphene and CNT based foams. The relatively high values of elastic modulus and hardness of MWCNT scaffolds further indicates the formation of nanoscale, covalent crosslinks between MWCNTs.

TABLE 1

Mechanical properties of MWCNT scaffolds determined by nanoindentation.

|  | MWCNT:BP 1:1 | | MWCNT:BP 1:2 | |
| --- | --- | --- | --- | --- |
| Indent # | Er (MPa) | H (MPa) | Er (MPa) | H (MPa) |
| 1 | 39.44 | 1.89 | 55.62 | 2.07 |
| 2 | 35.01 | 1.74 | 39.87 | 4.77 |
| 3 | 33.84 | 1.96 | 28.72 | 0.73 |
| 4 | 31.77 | 1.97 | 38.94 | 4.83 |
| 5 | 16.12 | 1.01 | 84.08 | 4.72 |
| 6 | 53.4 | 2.77 | 34.59 | 2.26 |
| 7 | 59.59 | 1.4 | 38.25 | 4.91 |
| Mean ± SD | 38.45 ± 14.42 | 1.82 ± 0.54 | 45.72 ± 18.78 | 3.47 ± 1.73 |

EXAMPLE 4

Figure 4:
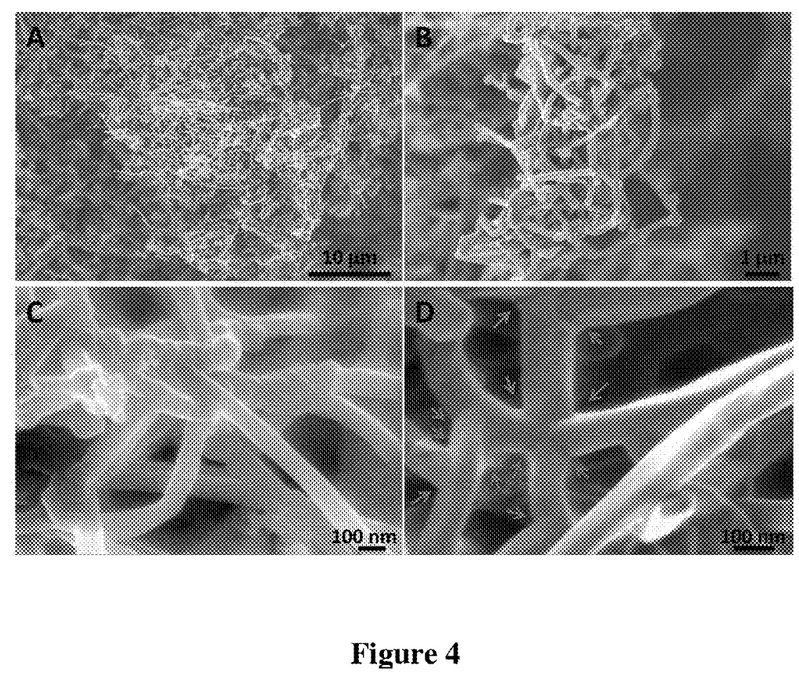
FIG. 4A-4D are photographic representations at different levels of magnification of three-dimensional carbon structures of the present disclosure.

In the following example, MWCNTs and benzoyl peroxide were mixed in the ratio of 1:4 according to the described methods. Scanning electron microscopy (SEM) was also performed on the three-dimensional carbon structures to characterize their structure, and confirm the cross-linking of the nanotubes. Some images captured from the SEM are shown in FIG. 4A-4D. FIGS. 4A and 4B show representative low-resolution SEM images of the formed three-dimensional carbon structures. The cross-sections show interconnected MWCNT networks that form the macroscopic three-dimensional structures. The high resolution SEM in FIGS. 4C and 4D also display the cross-linking between individual MWCNTs, and the formation of junctions (arrows, FIG. 4D). Unlike polymer chains that coil together tightly with no inter-chain space or airpockets, the cross-linked MWCNT network of the three-dimensional carbon structures is quite porous. The pores are irregular shaped and well-connected.

Figure 5:
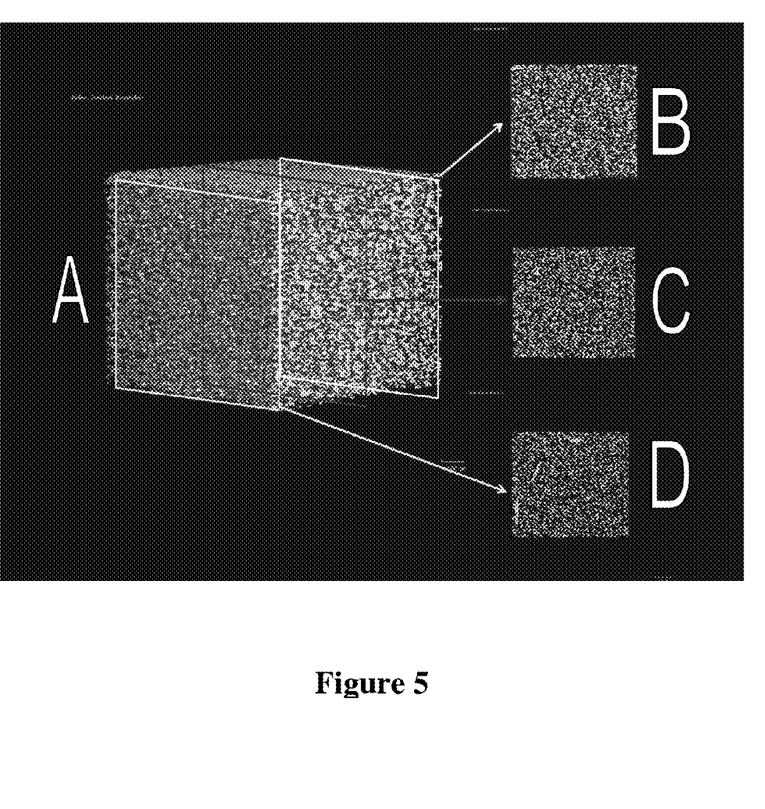
FIGS. 5A-5D are graphical representations of the pores of a three-dimensional carbon structure of the present disclosure.

The porosity and pore size of the three-dimensional cross-linked structures was evaluated by Micro Computed Tomography (microCT) and SEM image analysis. MicroCT was performed to assess the micro-porosity in the three-dimensional cross-linked structure specimen. FIG. 5A displays a three-dimensional reconstructed microCT image of a section of the three-dimensional cross-linked structure specimen in air, FIGS. 5B, 5C, and 5D show the top, middle and bottom section of the three-dimensional image displayed in FIG. 5A, and indicating the presence of pores (white voids). These observations were consistent by going through all individual cross-sections of the microCT reconstructed images without physical sectioning. The analysis of the microCT slices determined the pore sizes to be between 100-300 μm. The pores were interconnected, and distributed throughout the structure.

EXAMPLE 5

In the following example, MWCNTs and benzoyl peroxide were mixed in varying ratios between 1:0.5 and 1:4 according to the described methods.

Figure 6:
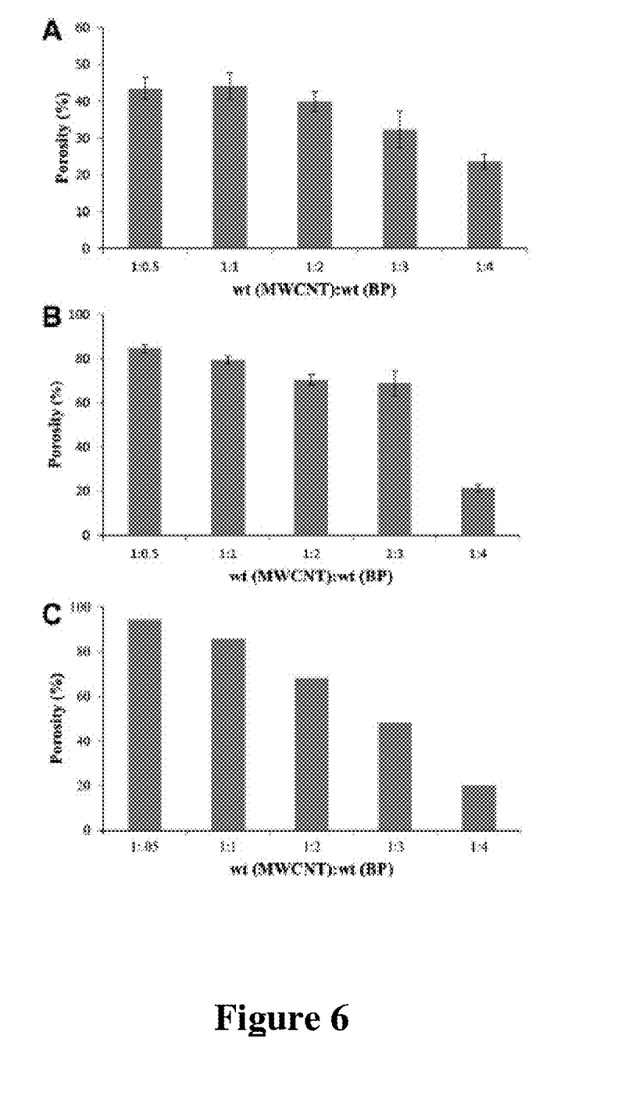
FIG. 6A-6C are a graphical representation of porosity of three-dimensional carbon structures of the present disclosure with varying MWCNT to benzoyl peroxide ratios

The microporosity of the three-dimensional cross-linked are shown in FIG. 6A-6C, arranged by ratio of MWCNTs to benzyl peroxide. The porosity was calculated as previously discussed in Example 1. As can be seen, the porosity can be manipulated by varying the amount of cross-linking agent, benzoyl peroxide in this example. It should be noted that since the three-dimensional cross-linked structures were fabricated by cross-linking MWCNTs, the microCT system possessing a resolution of 6 μm was not capable of detecting the presence of nano-sized pores.

As shown in FIG. 6A, the porosity is shown as it was determined by microCT data, as discussed above. Data represented in FIG. 6A is shown below in Table 2:

TABLE 2

Porosity of MWCNT scaffolds calculated from microCT analysis.

| MWCNT:BP ratio | Porosity (%) by microCT |
| --- | --- |
| 1:0.5 | 84.67 ± 1.70 |
| 1:1 | 79.26 ± 1.77 |
| 1:2 | 70.29 ± 2.34 |
| 1:3 | 68.80 ± 5.72 |
| 1:4 | 21.31 ± 1.52 |

To further quantify the nano-porosity, image processing was performed on a series of SEM images, and the porosity was calculated as previously discussed in Example 1. The porosity calculated by this method corresponds to the surface porosity and has been used to estimate the porosity values for sandstones and tissue engineering polymeric scaffolds. The nano-porosity from this analysis for the three-dimensional cross-linked structures was between about 65% and about 85% and the pore sizes were between 125 nm-0.75 μm.

SEM image analysis of three-dimensional cross-linked structures also showed that their nano-porosity could be manipulated by varying the amount of cross-linking agent, in this example benzoyl peroxide. FIG. 6B displays the plot of porosity of various three-dimensional cross-linked structures (calculated from the SEM image analysis) fabricated by mixing MWCNTs with benzoyl peroxide at different weight ratios (1:0.5, 1:1, 1:2, 1:3 and 1:4). The data represented in FIG. 6B is shown below in Table 3:

TABLE 3

Porosity of MWCNT scaffolds calculated from SEM analysis.

| MWCNT:BP ratio | Porosity (%) by SEM image processing |
| --- | --- |
| 1:0.5 | 43.424 ± 2.88 |
| 1:1 | 44.121 ± 3.66 |
| 1:2 | 39.895 ± 2.72 |
| 1:3 | 32.389 ± 4.93 |
| 1:4 | 23.623 ± 2.02 |

In addition to microCT and SEM image processing, LEP was performed to assess the porosity of MWCNT scaffolds. LEP is a widely used, IUPAC recommended, non-hazardous (no mercury) method to assess the porosity of ceramics, food products and nonwoven fibrous filter media beds. The porosity (%) and median pore diameter for all MWCNT scaffolds (MWCNT:BP mass ratios between 1:0.5 and 1:4) is presented in FIG. 6C. The results show a decreasing trend in porosity and average pore diameter as a function of MWCNT:BP ratio, similar to microCT and SEM image analysis. The macro-porosity and median pore diameter decreased from 94.48% to 20.19% and 324.48 μm to 115.87 μm, respectively, with increase in MWCNT:BP ratio. The data represented in FIG. 6C is shown below in Table 4:

TABLE 4

Porosity and median pore diameter of MWCNT scaffolds determined from liquid extrusion porosimetry.

| MWCNT:BP ratio | Porosity (%) by liquid extrusion porosimetry | Median pore diameter (μm) |
| --- | --- | --- |
| 1:0.5 | 94.485 | 324.48 |
| 1:1 | 85.684 | 312.96 |
| 1:2 | 68.275 | 288.76 |
| 1:3 | 48.305 | 141.00 |
| 1:4 | 20.194 | 115.87 |

These results, in addition to microCT and SEM analysis, indicate that an increase in the amount of benzoyl peroxide leads to a decrease in the scaffold micro- and nano-porosity.

It is hypothesized that the higher amount of benzoyl peroxide may be leading to an increase in the amount of active sites on the MWCNTs thereby inducing a higher degree of crosslinking, and thereby, altering the porosity.

EXAMPLE 6

In the following example, MWCNTs and benzoyl peroxide were mixed in a ratio of 1:4 according to the described methods to form a carbon structure.

The bulk resistivity of the carbon structure was assessed by a four-probe resistance measurement technique (Signatone S302-4, SP-4 probe) at Center for Functional Nanomaterials (CFN), Brookhaven National Laboratory, New York. Four point resistance measurements assess planar resistances for a theoretically infinitesimal thickness of sample. Thus, bulk material resistance can be derived from sheet resistance with a correction factor (F) to account for the thickness of the sample. The four, spring-loaded probes were equally spaced at 1.25 mm distances, with the two outer probes providing current and inner probes measuring voltage. Sheet resistance values for each MWCNT scaffold were measured at three different regions. Resistivity of the MWCNT scaffold was calculated by:

$$\rho = R_{sheet} * w * \frac{\pi}{\ln(2)} F$$

where ρ is the bulk resistivity, $R_{sheet}$ is the sheet resistance, w is the thickness of the sample (0.5 cm), and F is the correction factor. The conductivity was then obtained by calculating the 1/ρ value.

The bulk electrical conductivity of the MWCNT scaffolds (cylinders, 6 mm length, 5 mm diameter) was calculated to be $2 \times 10^{-1}$ S cm$^{-1}$ from four point resistivity measurements, satisfying the conductivity requirements for a large number of electrical applications. This electrical conductivity value is similar or higher than a large number of thin films prepared using carbon nanotubes or graphene with large networks of sp$^2$ carbon atoms, and scattered regions of sp$^3$ carbon atoms, but lower than thin films of carbon nanotubes or graphene with only sp$^2$ carbon networks.

Thus, the Raman and conductivity results taken together imply that the chemical composition of the MWCNT scaffolds mainly comprises of sp$^2$ carbon networks with sp$^3$ carbon junctions at the crosslinking sites.

While the present disclosure has been particularly shown and described with respect to specific embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A method of forming a carbon structure, the method comprising the steps of:
    providing a carbon material, wherein the carbon material is a nano material selected from the group consisting of multiwalled carbon nanotubes, single walled carbon nanotubes and combinations thereof;
    contacting the carbon material with a radical initiator to form a mixture;
    heating the mixture for a period of time to form the carbon structure, wherein the hardness of the carbon structure is from about 0.7 MPa to about 4.9 MPa.

2. The method of claim 1, wherein the ratio of carbon material to radical initiator in the mixture is between 1:0.5 to 1:4.

3. The method of claim 1, wherein a solvent is added to the mixture.

4. The method of claim 3, wherein the solvent is chloroform.

5. The method of claim 1, wherein the mixture is heated to about 60° C. for about 24 hours.

6. The method of claim 1, wherein the radical initiator is selected from the group consisting of a peroxide, benzoyl peroxide, a compound with a peroxide functional group (ROOR'), methyl ethyl ketone peroxide, Di-tert-butyl peroxide, benzoyl peroxide, acetone peroxide, bisacylphosphine oxide (BAPO), aluminophosphate (MAPO), tert-Amylperoxy-2-ethyl (TAPO) or azobisisobutyronitrile (AIBN) and combinations thereof.

7. The method of claim 1, wherein the elastic modulus of the carbon structure is from about 16 MPa to about 84 MPa.

8. The method of claim 1, wherein the carbon structure has a pore diameter of between about 125 nm and about 325 μm.

9. The method of claim 1, wherein the carbon structure has a porosity of about 20% to about 95%.

10. The method of claim 1, wherein the carbon structure has a dimension greater than about 1 mm.

11. The method of claim 1, further comprising annealing the carbon structure at about 150° C. for about 20 minutes.

12. A method of forming a carbon structure, the method comprising the steps of:
    providing a carbon material;
    contacting the carbon material with a radical initiator to form a mixture;
    heating the mixture for a period of time to form the carbon structure, wherein the carbon structure has a pore diameter of between about 125 nm and about 325 μm.

13. The method of claim 12, wherein the elastic modulus of the carbon structure is from about 16 MPa to about 84 MPa.

14. The method of claim 12, wherein the hardness of the carbon structure is from about 0.7 MPa to about 4.9 MPa.

15. The method of claim 12, wherein the carbon structure has a porosity of about 20% to about 95%.

16. The method of claim 12, further comprising annealing the carbon structure at about 150° C. for about 20 minutes.

17. A method of forming a carbon structure, the method comprising the steps of:
    providing a carbon material;
    contacting the carbon material with a radical initiator to form a mixture;
    heating the mixture for a period of time to form the carbon structure, wherein the carbon structure has a porosity of about 20% to about 95%.

18. The method of claim 17, wherein the elastic modulus of the carbon structure is from about 16 MPa to about 84 MPa.

19. The method of claim 17, wherein the hardness of the carbon structure is from about 0.7 MPa to about 4.9 MPa.

20. The method of claim 17, wherein the carbon structure has a pore diameter of between about 125 nm and about 325 μm.

21. The method of claim 17, further comprising annealing the carbon structure at about 150° C. for about 20 minutes.

\* \* \* \* \*